US008205772B2

(12) United States Patent
Hummel

(10) Patent No.: US 8,205,772 B2

(45) Date of Patent: Jun. 26, 2012

(54) DISPENSER

(75) Inventor: Karlheinz Hummel, Guetenbach (DE)

(73) Assignee: MegaPlast GmbH, Villengen-Schwenningen (DE)

(*) Notice: Subject to any disclaimer, the term of this patent is extended or adjusted under 35 U.S.C. 154(b) by 476 days.

(21) Appl. No.: 12/454,410

(22) Filed: May 18, 2009

(65) Prior Publication Data

US 2009/0283548 A1 Nov. 19, 2009

(30) Foreign Application Priority Data

May 19, 2008 (DE) ........................ 10 2008 024 181

(51) Int. Cl.
*G01F 11/08* (2006.01)
*G01F 11/02* (2006.01)
*G01F 11/00* (2006.01)

(52) U.S. Cl. .................................................... 222/321.7

(58) Field of Classification Search .................. 222/207, 222/319, 320, 321.1, 321.6–321.9

See application file for complete search history.

(56) References Cited

U.S. PATENT DOCUMENTS

| | | | |
|---|---|---|---|
| 5,224,627 A | 7/1993 | Weag | |
| 5,630,531 A * | 5/1997 | Gaucher | 222/96 |
| 6,021,924 A * | 2/2000 | Suck et al. | 222/105 |
| 2001/0054623 A1* | 12/2001 | Bonningue et al. | 222/321.7 |
| 2002/0166876 A1* | 11/2002 | Masuda | 222/309 |
| 2003/0230600 A1* | 12/2003 | Masuda | 222/321.7 |
| 2004/0055457 A1* | 3/2004 | Masuda | 92/13 |
| 2005/0173460 A1* | 8/2005 | Masuda | 222/321.7 |
| 2006/0237483 A1 | 10/2006 | Ophardt | |
| 2008/0093386 A1 | 4/2008 | Arminak | |

FOREIGN PATENT DOCUMENTS

| | | |
|---|---|---|
| DE | 78276 | 4/1894 |
| EP | 0 520 315 | 12/1992 |

* cited by examiner

*Primary Examiner* — Darren W Gorman

(74) *Attorney, Agent, or Firm* — Collard & Roe, P.C.

(57) ABSTRACT

A dispenser for fluid to pasty masses has a pump chamber that has an outlet valve. The pump chamber consists of an upper pump chamber part and a lower pump chamber part, which can be moved, relative to one another, for a pumping process. In order to prevent unintentional exit of mass under certain stresses such as severe vibrations, the outlet valve is moved into a release position before the beginning of a pumping process, by means of a control part.

13 Claims, 3 Drawing Sheets

DISPENSER

CROSS REFERENCE TO RELATED APPLICATIONS

Applicant claims priority under 35 U.S.C. §119 of German Application No. 10 2008 024 181.4 filed May 19, 2008.

BACKGROUND OF THE INVENTION

1. Field of the Invention

The invention comprises a dispenser for fluid to pasty masses, having a pump chamber with an outlet valve. The pump chamber consists of an upper pump chamber part and a lower pump chamber part, which can be moved, relative to one another, for a pumping process.

2. The Prior Art

Such dispensers have already become known in multiple configurations. As an example, reference is made to European Patent No. EP 0 520 315 A1.

In the case of the known dispenser, an undesirable exit of mass sometimes occurs as the result of a movement of the pump chamber parts relative to one another, triggered by a severe vibration or the like. It is true that transport locking devices are already known in this regard, but in the case of these devices, a corresponding adjustment of the dispenser must be made.

SUMMARY OF THE INVENTION

It is therefore an object of the invention to provide a dispenser in such a manner that no undesirable exit of mass occurs, at least under certain stresses, such as severe vibrations.

This object is accomplished, according to one embodiment of the invention, by means of a dispenser having a pump chamber with an outlet valve that is moved into a release position before the beginning of a pumping process, by a control part. In other words, the outlet valve is not displaced by the mass itself, as is usual, but rather must first be actively displaced into a release position. This displacement into the release position must take place prior to every pumping process. This means, at the same time, that otherwise, after the pumping process has ended, the outlet valve is in a locked position. A compulsory sequence of carrying out a pumping process results from this, in that the outlet valve must first be displaced into a release position, by way of a separate procedure, at the beginning of the pumping process. Severe vibration of the dispenser as a whole, or only slight contact with the part of the dispenser that must fundamentally be activated to carry out a pumping process, does not yet lead to an exit of mass.

It is particularly preferred that an activation part is provided to act on the upper pump chamber part, and that the control part is connected with the activation part. In this way, action on the activation part brings about an effect on the outlet valve, at the same time—and also at first, before the pumping process is carried out. No separate activation process is required. This leading effect on the outlet valve does not even have to become evident to the user.

Furthermore, the activation part can be a dispenser head part. For use, the dispenser head part is pressed down, and in this connection, movement of the outlet valve into the release position is preferably brought about first, followed by the pumping process, i.e. dispensing of the mass from a dispensing opening of the dispenser.

It is particularly preferred if the control part is configured as a mandrel connected with the activation part. In this way, the activation force can be transferred to the outlet valve in a simple manner, particularly if, as preferred, the mandrel extends vertically. Also, a space-saving configuration is achieved. It is also preferred if the control part does not yet act on the outlet valve during the first movement of the activation valve, but rather an idle stroke precedes this. This is achieved, for example, by means of a distance dimension between the top of the mandrel, for example, and the outlet valve.

It is further preferred that the outlet valve can be disposed in the upper pump chamber part, which is preferably configured to be movable, with regard to a lower pump chamber part, which is preferably configured to be fixed. Thus, the outlet valve is directly assigned to the dispenser head part, and this is accordingly advantageous if this part is configured as the activation part, at the same time.

The upper pump chamber part can furthermore be displaceable in the reverse direction, by means of the control part. This is advantageous if a reset spring, which is preferably provided in the dispenser, in order to move the pump chamber parts back apart from one another after they have been brought together, acts not on the upper pump chamber part, but rather on the dispenser part that has the control part, i.e., on the dispenser head part, for example. In this way, retraction of the upper pump chamber part can be brought about after the chamber parts have been brought together to carry out a pumping movement, by means of the control part, which can be tension-coupled with the upper pump chamber part in this regard.

In a further detail, the outlet valve is preferably configured so that it is pressed into its closure position, by means of the mass situated in the pump chamber, under pressure, without displacement into the outlet position in the case of movement of the pump chamber parts toward one another. In other words, not only does it close the pump chamber as long as it is not turned on, but also, a pressure that builds up in the chamber, for example due to severe vibrations, simultaneously increases the closure effect of the outlet valve.

In a further detail, the outlet valve has a valve plate and a valve shaft. The valve shaft is disposed to face away from the valve plate, in the dispensing direction.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
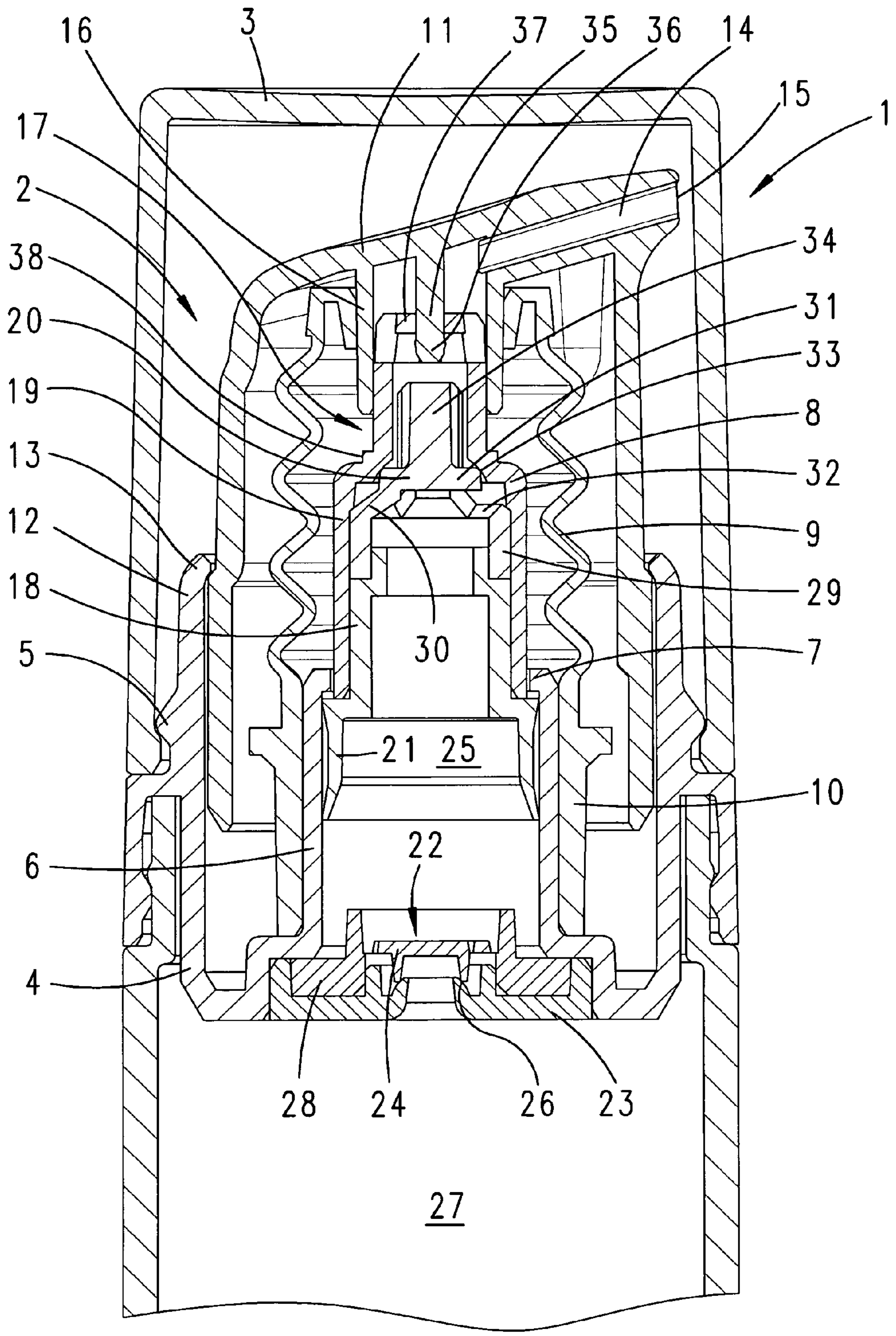
FIG. 1 shows a cross-section through a dispenser head set onto a tube part, covered by a protective cap, in the non-activated position.

With reference to FIG. 1, a dispenser 1 is shown and described, which is provided for dispensing materials that range from fluids to pasty masses, for example creams of a cosmetic type or toothpaste.

Dispenser 1 has a dispenser head 2, which is covered by a protective cap 3 in the representation in FIG. 1. Protective cap 3 is held on dispenser head 2 with a catch formed by catch beads 5 formed on lower dispenser head part 4.

Lower dispenser head part 4 simultaneously forms lower pump chamber part 6, which consists of a cylinder section that is open toward the top. The cylinder section has overlap projections 7, which limit the reverse stroke movement of upper pump chamber part 8, as will be explained below.

A reset spring in the form of a spring bellows 9 is disposed on the outside of lower pump chamber part 6. Spring bellows 9 rests against the lower pump chamber part on the outside, with a foot region 10. On the top, it supports itself on an underside of a dispenser head part 11.

Dispenser head part 11 is guided on the inside of a guide section 12 configured on lower dispenser head part 4, concentric to lower pump chamber part 6. Guide section 12 has projections 13 that project toward the inside, in order to limit movement, in fundamentally the same manner as lower pump chamber part 6, which projections can also be formed as a circumferential edge.

A dispensing tubule 14, which empties into a dispensing opening 15, is configured in dispenser head part 11. This opening is directed sideways.

Dispenser head part 11 furthermore has a cylindrical guide section 16 on the inside, also on the inside relative to the upper region of pump bellows 9, in which upper pump chamber part 17 is guided.

Upper pump chamber part 17 is composed, in detail, of a piston part 18, an accommodation part 19, and outlet valve 20 held between piston part 18 and accommodation part 19.

The piston part 18 has a piston section 21 on its underside, which is disposed on the inside of the cylinder section of lower pump chamber part 6, in a telescoping manner.

An inlet valve 22 is disposed in lower dispenser head part 4, which valve is held to catch in lower dispenser head part 4 by means of a holder part 23.

Both inlet valve 22 and outlet valve 20 consist of a soft plastic. In this connection, a valve plate 24 is provided in inlet valve 22, which plate lifts off from valve counter-surface 26 formed by the catch part, at a partial vacuum, i.e. during a reverse stroke movement of the upper pump chamber part 8 (FIG. 3) in pump chamber 25, and allows mass to enter from the supply chamber 27 into the pump chamber. Valve plate 24 is connected with an assembly section 28 of inlet valve 22, by way of connection arms not shown in any detail.

Outlet valve 20 also has a cylindrical assembly section 29, which is disposed on the inside of accommodation part 19. It is simultaneously overlapped at the bottom and on the inside by piston part 18.

Passageways 32 for the mass are provided in assembly section 29, which makes a transition into a valve plate 31 by way of a narrowing section 30. In the exemplary embodiment, passageways 32 are provided in the narrowing section 30. Valve plate 31 lies against accommodation part 19, by means of an upper edge 33, forming a seal. By means of valve plate 31 formed onto valve shaft 34, it projects into an upper, narrowed cylinder section of accommodation part 19.

Furthermore, a mandrel 35 directed downward is formed on dispenser head part 11, on the inside, which mandrel aligns with valve shaft 34. In the non-activated position according to FIG. 1, mandrel 35 is disposed at a vertical distance, with regard to its free end, from the upper free end of valve shaft 34. This results in a corresponding path when dispenser head part 11 is pressed down, to which no action on outlet valve 20 is assigned as yet.

Mandrel 35 possesses a bead-like thickened region 36 on its underside, which prevents it from being pulled out of passage bore 37 in accommodation part 19, through which mandrel 35 extends. At the same time, this allows retraction of the upper pump chamber part after it has been pressed down, as will be described further below.

Figure 2:
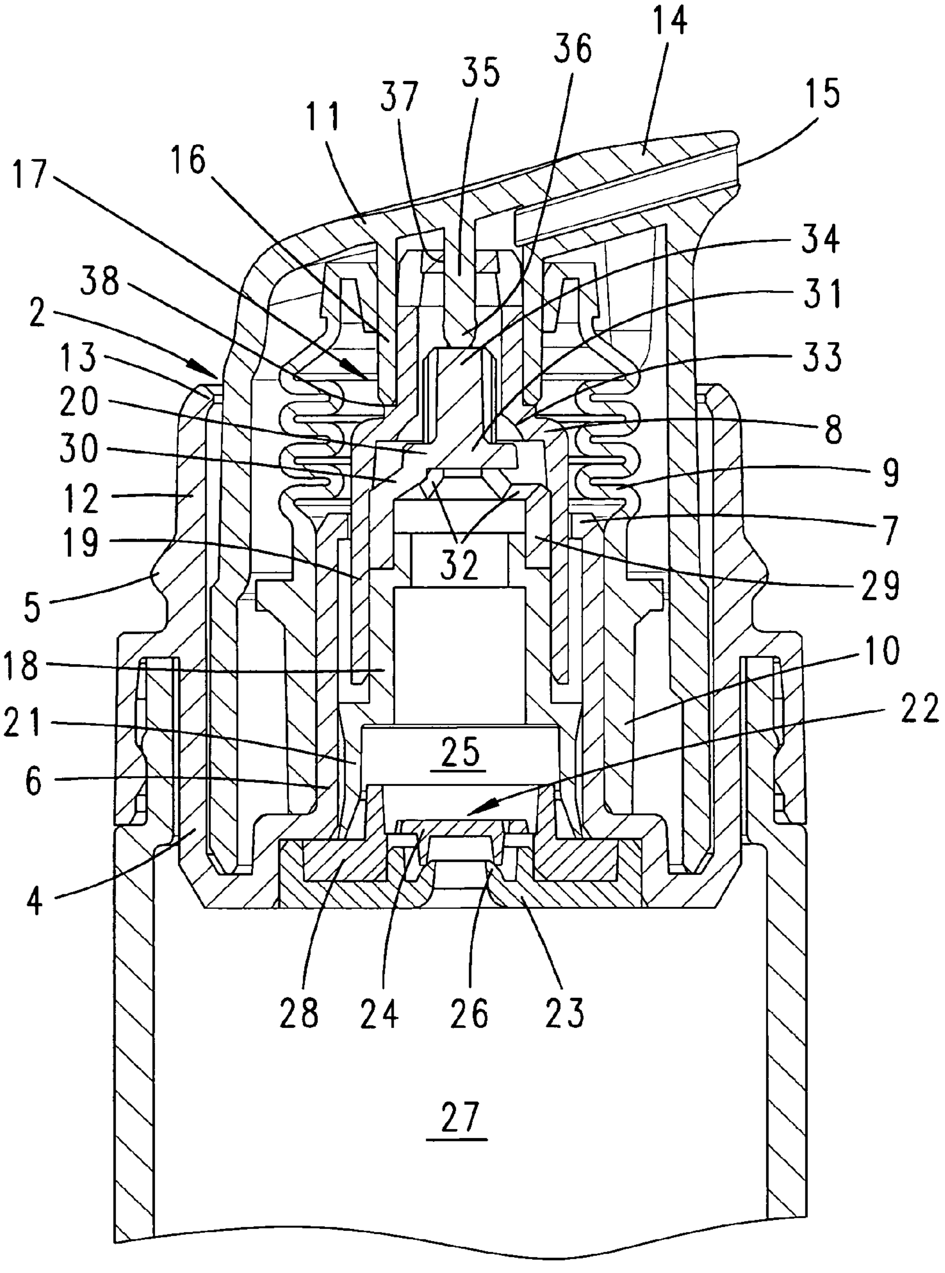
FIG. 2 shows a representation according to FIG. 1, without a protective cap, in the activated position.

When the dispenser is activated by pressing down on dispenser head part 11, dispenser head part 11 first moves down, while pump bellows 9 relaxes, until the face surface of mandrel 35 makes contact with the facing face surface of valve shaft 34. If the stroke is continued, dispenser head part 11 presses the outlet valve down, by means of mandrel 35 and valve shaft 34, in such a manner that valve plate 31 releases a passage from pump chamber 25 into dispensing tubule 14. Pressing the outlet valve down is limited by a stop position of guide section 16 on an outer shoulder 38 of accommodation part 19 assigned for this purpose, see FIG. 2. Once the aforementioned stop has been reached, a reduction in size of pump chamber 25 takes place during the further process, when dispenser head part 11 is pressed down further, and this is accompanied by dispensing of mass from pump chamber 25, through dispensing tubule 14 and opening 15.

Figure 3:
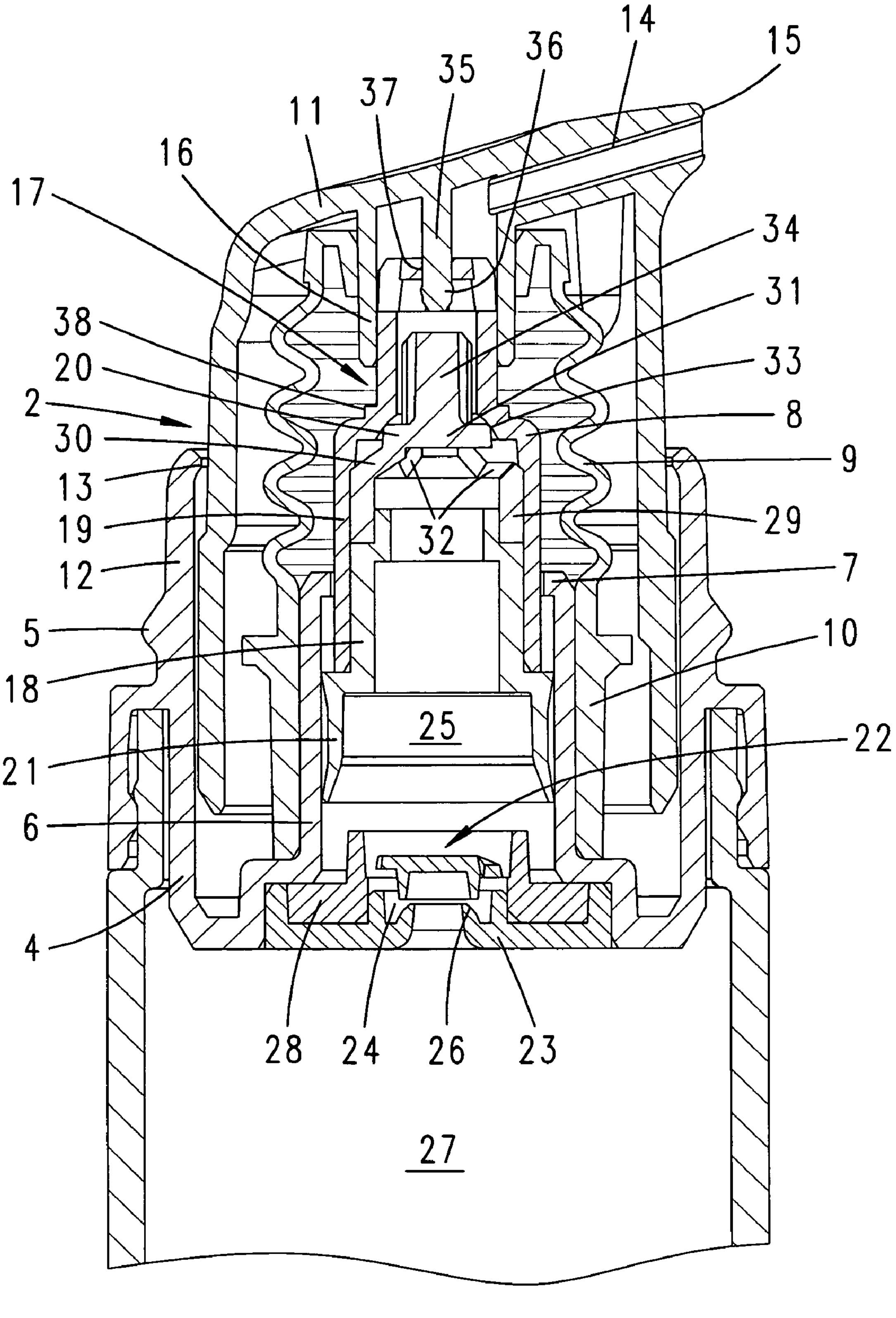
FIG. 3 shows a representation according to FIG. 1 and FIG. 2, respectively, showing the reverse stroke movement.

When the activation pressure is taken off dispenser head part 11, dispenser head part 11 moves back in the direction of its starting position according to FIG. 1, as the result of the spring effect of pump bellows 9. Such a state is shown in FIG. 3. In this connection, dragging the upper pump chamber part back into the starting position according to FIG. 1 is connected with this movement, because of the coupling of mandrel 35 with accommodation part 19. The reverse stroke is limited by contact of upper pump chamber part 17, i.e. piston part 18, in the concrete case piston section 21, on overlap projection 7, i.e. the stroke limitation by projection 13 that acts on upper dispenser part 11.

The disclosure content of the related priority application DE 10 2008 024 181.4 is hereby incorporated by reference into the disclosure of this application.

Accordingly, while only a few embodiments of the present invention have been shown and described, it is obvious that many changes and modifications may be made thereunto without departing from the spirit and scope of the invention.

REFERENCE SYMBOL LIST

1 dispenser
2 dispenser head
3 protective cap
4 lower dispenser head part
5 catch beads
6 lower pump chamber part
7 overlap projections
8 upper pump chamber part
9 spring bellows
10 foot region
11 dispenser head part
12 guide section
13 projections
14 dispensing tubule
15 dispensing opening
16 guide section
17 upper pump chamber part
18 piston part
19 accommodation part
20 outlet valve
21 piston section
22 inlet valve
23 holder part

24 valve plate
25 pump chamber
26 valve counter-surface
27 supply chamber
28 assembly section
29 assembly section
30 narrowing section
31 valve plate
32 passageways
33 upper edge
34 valve shaft
35 mandrel
36 thickened region
37 passage bore

What is claimed is:

1. A dispenser for fluid to pasty masses, comprising:

a pump chamber that has an upper pump chamber part and a lower pump chamber part, the upper and lower pump chamber parts being movable relative to one another, for a pumping process;

an outlet valve engaging the upper pump chamber part; and a control part that moves the outlet valve into a release position before beginning the pumping process, wherein the control part is disposed at a vertical distance from the outlet valve before the beginning of the pumping process, and wherein the control part presses the outlet valve down after contacting the outlet valve in the course of the pumping process, wherein the control part moves the upper pump chamber part from a final pumping position into a starting pumping position.

2. The dispenser according to claim 1, further comprising an activation part, said activation part being provided to act on the upper pump chamber part, wherein the control part is connected with the activation part.

3. The dispenser according to claim 2, wherein the activation part is a dispenser head part.

4. The dispenser according to claim 2, wherein the control part is configured as a mandrel connected with the activation part.

5. The dispenser according to claim 1, wherein the outlet valve is disposed in the upper pump chamber part, and wherein the upper pump chamber part is movable and the lower pump chamber part is fixed.

6. The dispenser according to claim 1, wherein the outlet valve is pressed into a closure position, by means of a mass situated in the pump chamber, under pressure, without displacement into the release position when the pump chamber parts are moved toward one another.

7. The dispenser according to claim 1, wherein the outlet valve has a valve plate and a valve shaft, the valve shaft being disposed to face away from the valve plate, in a dispensing direction.

8. A dispenser for fluid to pasty masses, comprising:

a pump chamber that has an upper pump chamber part and a lower pump chamber part, the upper and lower pump chamber parts being movable relative to one another, for a pumping process;

an outlet valve engaging the upper pump chamber part; and a control part that moves the outlet valve into a release position before beginning the pumping process, wherein the control part is disposed at a vertical distance from the outlet valve before the beginning of the pumping process, and wherein the control part presses the outlet valve down after contacting the outlet valve in the course of the pumping process, wherein the outlet valve has a valve plate and a valve shaft, the valve shaft being disposed to face away from the valve plate, in a dispensing direction.

9. The dispenser according to claim 8, further comprising an activation part, said activation part being provided to act on the upper pump chamber part, wherein the control part is connected with the activation part.

10. The dispenser according to claim 9, wherein the activation part is a dispenser head part.

11. The dispenser according to claim 9, wherein the control part is configured as a mandrel connected with the activation part.

12. The dispenser according to claim 8, wherein the outlet valve is disposed in the upper pump chamber part, and wherein the upper pump chamber part is movable and the lower pump chamber part is fixed.

13. The dispenser according to claim 8, wherein the outlet valve is pressed into a closure position, by means of a mass situated in the pump chamber, under pressure, without displacement into the release position when the pump chamber parts are moved toward one another.

* * * * *